Jan. 4, 1955    W. FISHER-LUTTRELLE ET AL    2,698,542
GYROVERTICAL
Filed Jan. 10, 1951    2 Sheets-Sheet 1

INVENTORS
WILLIAM FISHER-LUTTRELLE
FRANK DOVE
BY
Herbert H. Thompson
THEIR ATTORNEY INVENTORS
WILLIAM FISHER-LUTTRELLE
FRANK DOVE
BY
Herbert H. Thompson
THEIR ATTORNEY

United States Patent Office 2,698,542
Patented Jan. 4, 1955

2,698,542
GYROVERTICAL

William Fisher-Luttrelle, Holyport, and Frank Dove, St. Albans, England, assignors, by mesne assignments, to The Sperry Gyroscope Company, Limited, Brentford, England, a British company Application January 10, 1951, Serial No. 205,352

Claims priority, application Great Britain January 16, 1950

9 Claims. (Cl. 74—5.7)

This invention relates to an electrically operated gyroscopic vertical for aircraft adapted to be brought rapidly into its normal operating condition.

It is well known that it is extremely desirable under certain conditions for aircraft gyroscopic instruments of this character to be readily available for use in a matter of seconds after initially switching on; for example, a fighter aircraft waiting on an aerodrome may be required to take off within a few seconds of receiving a raid warning, and it is extremely desirable therefore that the gyroscopic vertical be ready for use to the pilot of the aircraft as soon as he leaves the aerodrome.

It is an object of the present invention to provide an electrically operated gyroscopic vertical which will be ready for use as a reference instrument very shortly after initially switching it on. In order to realise the object of the invention it is essential in the case of a single rotor instrument that the rotor case should be at least within a few degrees of its normal operating position relative to the vertical when the instrument is initially switched on. This can be realised by arranging that the rotor case has a predetermined amount of pendulousness at least when the instrument is switched on and preferably for a predetermined time afterwards. The present invention is primarily concerned with providing a novel arrangement for achieving this result.

According to the invention therefore there is provided an electrically operated gyroscopic vertical adapted to be brought rapidly into its normal operating condition of the kind wherein a gyroscopic element, mounted with freedom to tilt about two mutually perpendicular horizontal axes, is controlled by gravity responsive erection control means to assume a position having a predetermined relationship to the gravity vertical and wherein the gyroscopic element is in substantially neutral equilibrium about its axes of support when the instrument is in its normal operating condition but is pendulous about the said axes when the instrument is not operating so that the gyroscopic element is then brought to within a few degrees of its operating position with respect to the gravity vertical, characterised by the fact that the change from pendulous condition to a condition of neutral equilibrium when the gyroscope is operating is effected by energisation of a winding of an electromagnetc, forming part of a movable mass mounted on the gyroscopic element for movement thereon substantially normal to the two axes of support of the gyroscopic element, causing the winding and the mass to move vertically upwards relative to the core of the electromagnet, which is fixed to the gyroscopic element, into a position in which the said mass abuts against a stop fixed with respect to the gyroscopic element.

Means may also desirably be provided for enabling a high erection rate to be employed during a predetermined portion of the starting up period of the rotor and for automatically changing this high erection rate to a normal erection rate by the time that the rotor has reached its normal running speed, whereby "nutational" disturbances may be substantially eliminated.

It is well known that a gyroscopic vertical is subject to quite appreciable disturbances during the initial portion of its starting up period more especially if the gravity responsive erection control means employed is brought into operation immediately. These disturbances are commonly called nutational disturbances.

When the rotor is initially energised so as to be accelerated the reaction torques acting on the rotor bearing frame during the initial acceleration period have, if the rotor axis is inclined at an angle to the gimbal ring, a component acting about that main gimbal axis. This component may act in the same sense as the erection torque due to the erection device about that axis when the rotor axis is tilted, and, if the rotor is not running at a sufficient speed to have a high enough angular momentum to be precessed in the usual manner to its normal condition, the gimbal ring itself will be turned about its axis and thus cause disturbances of the rotor. These nutational disturbances eventually die out but they may act to delay the erection of the rotor to its normal position.

A further point is that when the rotor has sufficient angular momentum to be precessed in the normal manner the reaction torques referred to serve, if the rotor axis is inclined to the direction orthogonal to the gimbal ring, to precess the rotor axis to this orthogonal position. This may have deleterious effects since, sometimes, the reaction torques are stronger than the erection torques applied by the normal erection device, and if the gimbal ring is inclined to the horizontal, as may be the case in an aircraft on the ground, the reaction torques will overcome the erection torques and the rotor axis will be precessed to the orthogonal position instead of to the vertical. This is obviously disadvantageous, since, when the aircraft levels out after take off, the rotor axis might still be inclined to the vertical, and although it will be erected by the normal erection control means after the acceleration of the rotor has stopped, and it has reached its normal running speed, this will not take place quickly enough for the instrument to be available for use soon after switching on.

A feature therefore is the provision of an arrangement by means of which a high erection rate is automatically produced only after the rotor has acquired sufficient angular momentum to enable it to be precessed normally, and this high erection rate is changed to the normal erection rate after the acceleration period of the rotor has stopped. For this purpose the operation of at least one of the torque motors forming part of the erection control means is controlled to be dependent upon the amount of current taken by the rotor windings, which, as is well known, falls on initially switching on from a high starting value to a lower final running value. In this way, if the rotor is tilted from the vertical, the torque applied by the torque motor is high. After the rotor current is switched on, it gradually decreases to a normal constant amount when the rotor is up to speed. Preferably the torque motor is of the two-phase type and one of its windings is connected in series with one of the lines of the three-phase supply to the stator windings of the rotor, so that the current flowing through the winding of the torque motor is the same as that flowing through the rotor windings and therefore is such that it falls from a high value when the rotor is initially switched on to a lower constant value when the rotor is running at normal speed.

An embodiment of the invention will now be described by way of example only with reference to the accompanying drawings, in which Fig. 1 is a schematic view of part of a single rotor instrument showing a rotor case mounted in a gimbal ring.

Figure 1:
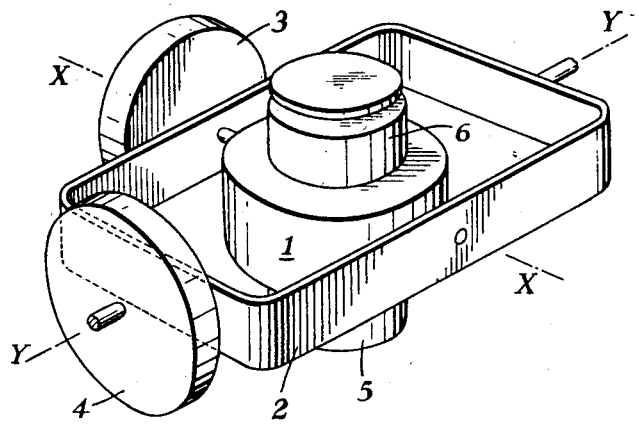

Referring now to Fig. 1 the parts of the instrument shown comprise a gyroscopic element in the form of a rotor case 1 in which an electrically driven rotor (not shown) is mounted for spinning about a normally substantially vertical axis. The rotor case 1 is mounted for angular movement about an athwartships axis X—X in a gimbal frame 2 which in turn is mounted for angular movement about a fore-and-aft axis Y—Y in an instrument housing (not shown). As is well known a gravity-responsive erection control means has to be provided to ensure that the rotor axis is maintained substantially vertical at all times. For this purpose, in the present case, there are provided two electrical torque motors 3 and 4, one mounted on the gimbal ring 2 for applying torques to the rotor case 1 about the athwartships axis X—X and the other mounted on the instrument housing (not shown) for applying torques to the rotor case 1 about the fore-and-aft axis Y—Y. A gravity responsive device 5, including a pair of mercury switches (37, 41, Fig. 3) is mounted at the bottom of the rotor case 1 and controls the supply of electrical energy to the torque motors on tilt of the rotor case to cause the application of torques to the rotor case to precess it to remove the tilt.

When in operation the rotor case 1 is substantially in neutral equilibrium about its axes X—X, Y—Y. However, if this were the case when the instrument is initially switched on, the rotor case might be tilted at a large angle to the gravity vertical and therefore some considerable time might elapse before the gravity responsive erection control means was able to erect it. The present invention aims at providing simple means for assuring that the rotor axis is near the vertical position at the time that the gyro-vertical is initially switched on. For this purpose there is provided on the rotor case 1 a device 6 by means of which the rotor case 1 is rendered initially pendulous for a predetermined interval of time after initially switching on the gyro-vertical and is thereafter automatically rendered substantially neutral.

Figure 2:
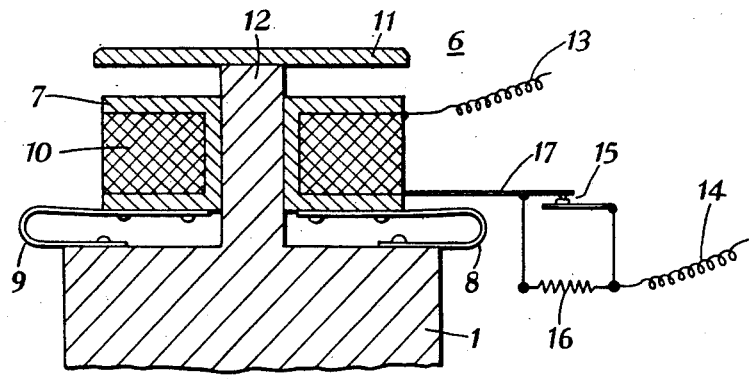
Fig. 2 is a cross-sectional view of the device 6 mounted on the rotor case.

The device 6, which is shown in greater detail in Fig. 2, operates to effect a change in the position of the centre of gravity of the rotor case 1 with respect to its axes of support and comprises a spool-shaped mass 7 of magnetic material having a vertical axis of symmetry with a central cylindrical bore. The mass has wound on it a winding 10. Attached to the rotor case 1 and extending vertically upwards through the bore of the mass 7 but without touching it is a stub shaft 12 to the upper end of which is attached a plate or armature member 11 of magnetic material. It will be seen that shaft 12 and armature member 11 form a generally mushroom-shaped member of which shaft 12 is the stem portion and armature member 11 is the cap portion. The mass 7 is resiliently mounted on the rotor case 1 by means of J-shaped blade springs 8, 9 which are so designed as to permit vertical movement of the mass 7 whilst substantially preventing lateral movement thereof. When the winding 10 is energised the mass is raised vertically against the action of the springs by the attraction between the plate member 11 and the mass 7. The shaft is not intended to act as a guide for the movement of the mass 7 but merely serves as a convenient means of attaching the member 11 to the rotor case 1 and also as a means for preventing damage being caused to the springs 8, 9 when the instrument is not in use and is subject to large acceleration forces.

When the mass 7 is in its upper position, that is, abutting against the member 11, the rotor case is substantially in neutral equilibrium about its axes of support, but when it is in its lower position the rotor case is pendulous so that the axis of the rotor will be within a few degrees, at least, of its normal operating position. By making the mass 7 and the coil 10 as one unit moving together an overall reduction in weight of the rotor case is effected as compared with the alternative possible arrangement in which the coil would be fixed to the rotor case and the movable mass separate from it.

The winding 10 is energised through leads 13, 14 and an energy economising resistor 16 across which a switch 15 is connected with short circuits the resistor 16 when the mass 7 is in its lower position. When the winding 10 has been energised and the mass 7 has been raised to its upper position the contact 15 will be broken by the lifting of the arm 17 attached to the mass 7, thus leaving the economising resistor 16 in series in the energising circuit of the winding 10. This prevents the winding 10 from being fully energised during the whole of the operational period of the instrument. The resistor 16 is proportioned to pass only sufficient current to the winding 10 for the latter to retain the mass 7 in its upper position of abutment against the member 11. When the resistor is short circuited a greater current is passed to energise the winding sufficiently to lift the mass 7 from its lower position in spite of the increased air gap between the mass 7 and the member 11. As a result of this feature overheating and consequent rapid deterioration of the winding is prevented.

The use of the movable mass 7 is one of the features by which the instrument is rendered capable of being put rapidly into operation. Preferably it is used in combination with other features which will now be described and all of which contribute to the realisation of this aim.

Figure 3:
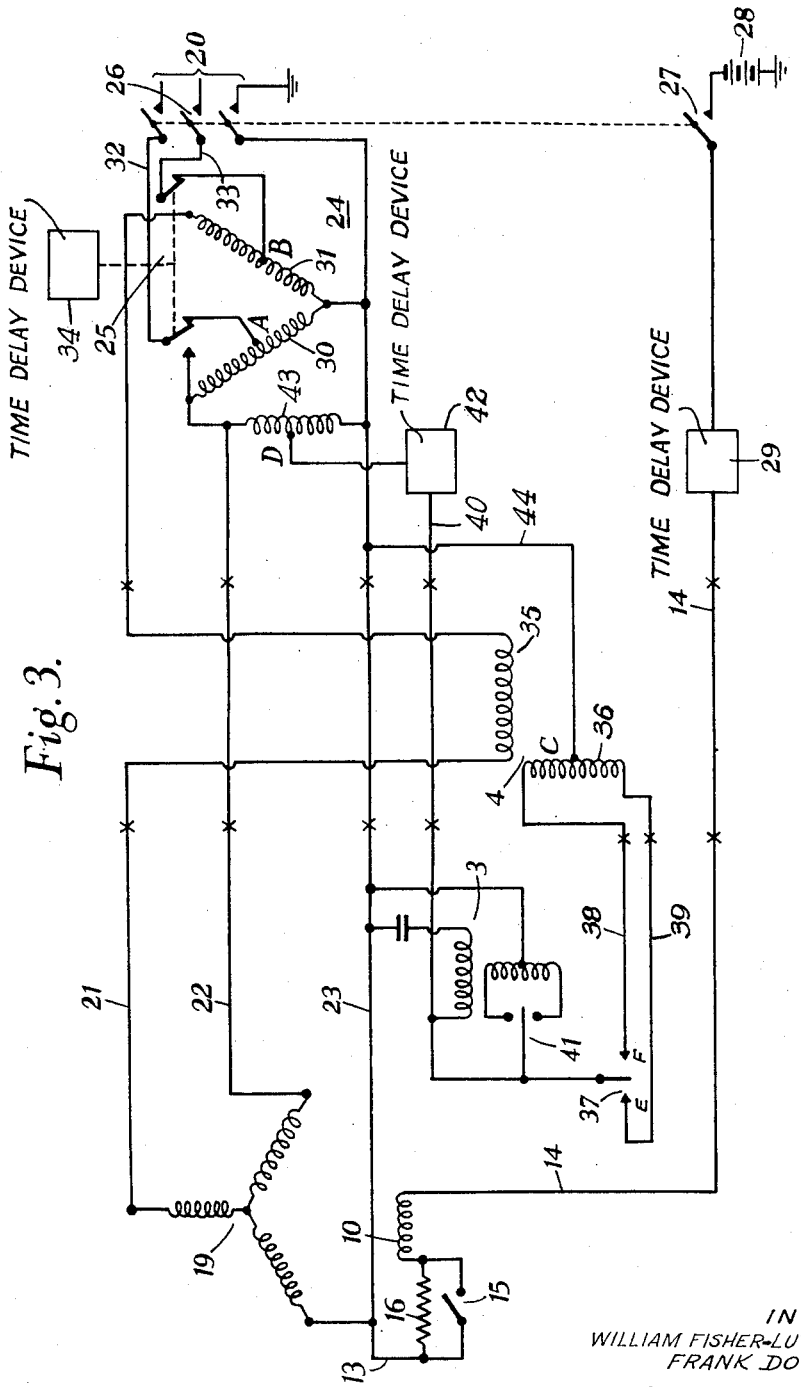
Fig. 3 is a schematic circuit diagram illustrating the operating principles of the invention.

Referring to Fig. 3, the three-phase stator windings 19 of the rotor of the instrument are connected to the three-phase source 20 through leads 21, 22, 23, auto-transformer 24, switch 25 and main switch 26, by means of which the instrument is rendered operative. When the main switch 26 is closed a further switch 27, which may comprise a pair of auxiliary contacts on switch 26, is also simultaneously closed to connect the winding 10 to a source of direct current 28 through leads 14, 13, and 23, to ground. In the lead 14 there is inserted a time-delay device 29, which prevents the energisation of the winding 10 until a predetermined time has elapsed. During this time the rotor case will be pendulous so that the rotor axis will be near to its normal operating position relative to the gravity vertical.

Initially the switch 25 is in the position shown in the drawing, in which the leads 32, 33, from the three-phase source are connected to tapping points A, B, of the windings 30, 31, so that, when the main switch 26 is closed, the voltages supplied to the stator windings 19 are stepped up versions of those from the source due to the windings 30, 31 acting as auto-transformers. The rotor is thus rapidly accelerated to its normal running speed.

After a predetermined time interval a time-delay device 34 operates the switch 25 to disconnect the supply leads 32, 33 from the tapping points A and B of windings 30, 31 and to connect the windings directly to the stator windings 19 to maintain the rotor spinning at its normal running speed.

The torque motor 4 comprises the two-phase windings 35, 36. The ends of the winding 36 are connected by leads 38, 39 to the two contact points E, F, of the mercury switch 37, the centre contact of which is connected by lead 40 including time-delay device 42, to a tapping point D of an inductance 43 connected across an appropriate pair of legs of the three-phase supply 20. The centre point of the winding 36 of the torque motor 4 is connected by lead 44 to the lead 23 of the three-phase supply 20 to complete the circuit for energising the winding 36. The mercury switch 37 detects tilt of the rotor bearing frame about the axis X—X by connecting either the lead 38 or the lead 39 in the circuit to the winding 36 in dependence on the direction of tilt. This determines the sense of the torque applied to the rotor case 1 by the torque motor 4.

The connection to the tapping point D of the winding 43 serves to reduce the line volts to the winding 36.

The time delay device 42 serves to delay the operation of the torque motor 4 until a predetermined time interval has elapsed after initially closing the main switch 26.

The winding 35 of the torque motor 4 is connected in series in the lead 21 of the three-phase supply of the stator winding 19. In this way the energisation of the winding 35 is dependent upon the current taken by the windings 19 which falls from a high value, when the gyro-vertical is initially switched on, to a lower constant value when the rotor is running at its normal running speed. Thus, initially, the current flowing through the winding 35 is high and the torque applied by the torque motor 4 in response to a tilt of the rotor case is large. The rotor case will consequently be rapidly erected to its normal position relative to the vertical. When the rotor reaches its full normal speed the winding 35 will be energised by the normal "running" value of the current in lead 21 to the stator windings which is lower than the current during the starting up period of the rotor and the erecting torques applied by the torque motor 4 will be proportionally lower.

The torque motor 3 is similar in construction and operation to the torque motor 4 except that its permanently energised winding is not connected in series in one of the legs of the three-phase supply. Instead it is connected across an appropriate pair of legs. As shown this winding of the torque motor 3 is connected to the leads 23 and 40 of the three-phase supply. The ends of the other winding of the torque motor are connected to the two outer contacts of a mercury switch 41 the centre contact of which is connected to the lead 40.

The centre point of this winding of the torque motor is connected to the lead 23. The mercury switch operates to detect tilt of the rotor case 1 about the axis Y—Y by connecting either of the outer contacts to the centre contact in dependence on the direction of tilt.

The time delay device 42 is connected in the circuit to the torque motor 3 so that it does not become effective until after a predetermined time interval has elapsed after the starting switch is closed.

It will thus be seen that with this preferred embodiment of the invention an instrument is provided having a starting arrangement by means of which a sequence of operations is automatically carried out which results in the rotor being brought to its normal running speed and being erected substantially to the vertical in a very short time compared with the time normally taken by such instruments.

In operation when the main switch 26 is closed the stator windings 19 of the rotor are connected to the three-phase supply through the auto-transformer 24 in such a manner that the stator windings are provided with stepped-up voltages and the rotor is rapidly accelerated. After a short period, say four seconds, as determined by the time delay device 42 the torque motors 3 and 4 are operatively connected to the supply. During this time the rotor speed will have reached a value of, say, 1,000 R. P. M. which is but a fraction of its normal running speed. During this time also the rotor case will have been pendulous so that it will be at least within a few degrees of the vertical. At a time determined by the time-delay device 29, which is substantially the same as the time at which the torque motors are connected in the circuit, the winding 10 is energized so as to move the mass 77 to its upper position in which the rotor case is in substantially neutral equilibrium about its axes. Since when, the torque motors are rendered effective the angular momentum of the rotor is quite low compared with its value when the rotor is running at its normal speed and since, also, the rotor will already be within a few degrees of the vertical, it will readily be appreciated that the rotor-case will consequently be rapidly erected to its normal operating position.

The use of the time-delay switch 42 which allows the rotor to spin up to a low speed before the torque motors are rendered effective ensures that they operate substantially only to produce precessional erection and are prevented from producing nutational disturbances such as would result if they were to operate before the rotor had acquired sufficient angular momentum.

As has been pointed out the winding 35 of the torque motor 4 is connected in series with the lead 21 from the three-phase source to the stator windings 19 so that the torque applied by the torque motor gradually falls from a high value to a lower normal value when the rotor is spinning at a constant speed. Accordingly there is always a margin of erection torque available during the second stage of the acceleration period of the rotor to overcome disturbing precessional torques tending to bring the rotor case 1 to the orthogonal position with respect to the gimbal ring 2 and arising from reactions of the rotor against its angular acceleration about its spin axis if the gimbal ring is inclined to the horizontal.

When the mass 7 is lifted to the upper position the arm 17 breaks the contact 15 and the winding 10 is then energised through the resistor 16 with the beneficial results referred to above.

After a predetermined time interval as determined by the time delay device 34 and normally of sufficient duration to allow the rotor to be brought up to its normal running speed, the switch 25 is automatically switched over to its normal position by the time delay device 34, so that the stator windings 19 are supplied with the normal voltages required to maintain the rotor spinning at its normal speed.

The time delay devices 29, 34, 42 have not been described in detail as each may take any one of several well known different forms.

It is to be understood that the invention is not restricted solely to the details of the form described above since various modifications may be introduced as they become desirable in order to carry the invention into effect under different conditions and requirements that may have to be fulfilled, without departing from the scope of the invention.

We claim:

1. The combination in a gyroscopic vertical of, a gyroscopic rotor, a rotor case supporting the rotor, a ring universally supporting said case in neutral equilibrium during operation of the rotor with freedom about two normally horizontal, mutually perpendicular axes, means for lowering the center of gravity of the case to make it pendulous when the gyroscopic rotor is inoperative including a mass shifting device having an electromagnetic element and an armature element, one of which provides a vertically shiftable mass attached by connecting springs to the case and the other of which is fixed to the case, and a starting arrangement for the gyroscopic rotor having an energizing circuit to the electromagnetic element including a time delay device in said circuit, said time delay device operating to delay energization of said electromagnetic element for a predetermined time interval after the rotor has started.

2. A gyroscopic vertical as claimed in claim 1, in which the electromagnetic element provides the shiftable mass and the armature element is fixed to the rotor case.

3. A gyroscopic vertical as claimed in claim 1, in which the spring connection between the shiftable mass element and rotor case permits vertical axial movement of the mass while substantially preventing lateral movement thereof.

4. The combination in a gyroscopic vertical of, a gyroscopic rotor, a rotor case supporting the rotor, a ring universally supporting said case in neutral equilibrium during operation of the rotor with freedom about two normally horizontal, mutually perpendicular axes, means for lowering the center of gravity of the case to make it pendulous when the gyroscopic rotor is inoperative including a mass shifting device having an electromagnetic winding element and an armature element, the winding element forming a vertically shiftable mass attached by connecting springs to the case and the armature element being rigidly fixed to the case, and a starting arrangement for the gyroscopic rotor including means for energizing said winding element.

5. The combination in an electrically operated gyroscopic instrument, of a rotor spinning electric motor of the character that draws a decreasing amount of current as the motor accelerates from a standstill condition, erecting means for the instrument including an electric torque motor having two field windings, a starting switch connected to a source of electrical energy, a circuit connecting said switch and the rotor spinning electric motor including one of the windings of the electric torque motor, and a second circuit connecting said switch and the other of the field windings of the electric torque motor including a time delay device, said time delay device operating upon closure of said starting switch to render said electric torque motor ineffective for an initial predetermined time interval at the start of the accelerating period of the rotor spinning electric motor, the torque motor thereafter being overenergized for the remaining portion of the accelerating period of the rotor spinning electric motor by the winding included in the circuit connecting the switch and the rotor spinning electric motor.

6. A gyroscopic instrument as claimed in claim 5, in which the circuit connecting the starting switch and the rotor spinning electric motor includes transformer means initially effective to energize the motor at a higher voltage level than the normal voltage level.

7. The combination in a gyroscopic vertical of, a gyroscopic rotor, electric motor means for operating said rotor, a rotor case supporting the rotor, a ring universally supporting said case in neutral equilibrium during operation of the rotor with freedom about two normally horizontal, mutually perpendicular axes, means for lowering the center of gravity of the case to make it pendulous when the gyroscopic rotor is inoperative including a mass shifting device having an electromagnetic element and an armature element, one of which provides a vertically shiftable mass attached by connecting springs to the case and the other of which is fixed to the case, an energizing circuit for the rotor operating electric motor, an energizing circuit for the electromagnetic element comprising a time delay device, a resistor, and means for short circuiting the resistor including a switch with contacts that are opened by shifting of the mass to its raised position, and switching means for closing the energizing circuits to start the gyroscopic vertical, whereby the case is placed in neutral equilibrium at a predetermined interval after the instrument is started.

8. A gyroscopic vertical comprising a gyroscopic rotor having an axis of rotation, a rotor case supporting the rotor for rotation about said axis, a ring universally supporting said case with freedom about two normally horizontal, mutually perpendicular axes, and electromagnetic means for lowering the center of gravity of the case to make it pendulous comprising a generally mushroom-shaped member having its stem portion mounted atop said case in coaxial alignment with said rotor axis, an electromagnetic element symmetrically disposed about said stem portion and adapted freely to move vertically along the length thereof between the top of the rotor case and the cap portion of said member, said cap portion being formed of magnetic material to serve as a fixed armature for said electromagnetic element, said element providing a shiftable mass for placing the gyroscopic vertical in substantially neutral equilibrium about said axes of freedom when said element abuts said cap portion, and a starting arrangement for said rotor having an energizing circuit to the electromagnetic element for causing the same to abut said cap portion, said circuit including a time delay device whereby the pendulosity of said gyroscopic vertical is removed at a predetermined time interval after the rotor has started.

9. The gyroscopic vertical of claim 8 wherein the electromagnetic mass element is connected by resilient means to the top of the rotor case for urging said element toward a pendulosity-producing position.

References Cited in the file of this patent
UNITED STATES PATENTS

| | | |
|---|---|---|
| 2,278,913 | Carter | Apr. 7, 1942 |
| 2,382,993 | Haskins | Aug. 21, 1945 |
| 2,555,981 | Lynch et al. | June 5, 1951 |
| 2,567,948 | Lane | Sept. 18, 1951 |
| 2,589,874 | Seliger | Mar. 18, 1952 |